Oct. 11, 1949.                R. G. JEWELL                2,484,569
               SELF-POSITIONING CIRCUIT BALANCING
                         TELEMETER RECEIVER
                        Filed Dec. 15, 1948
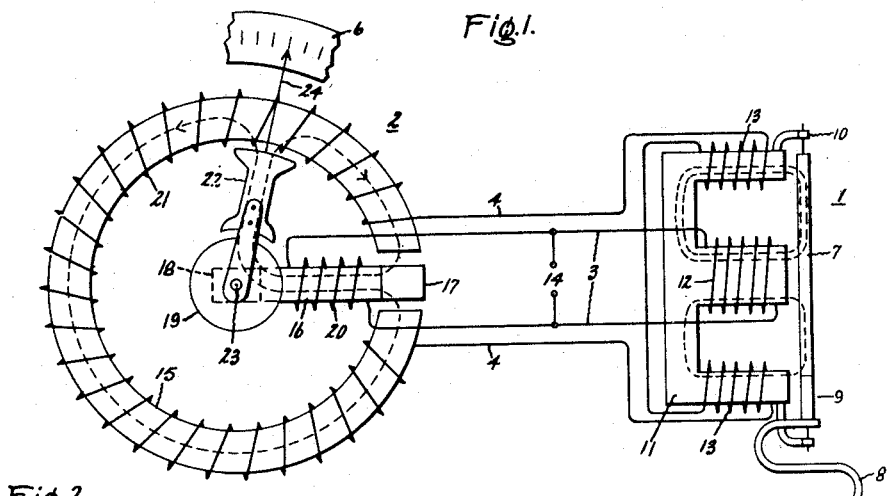
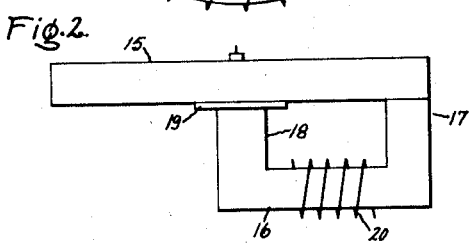
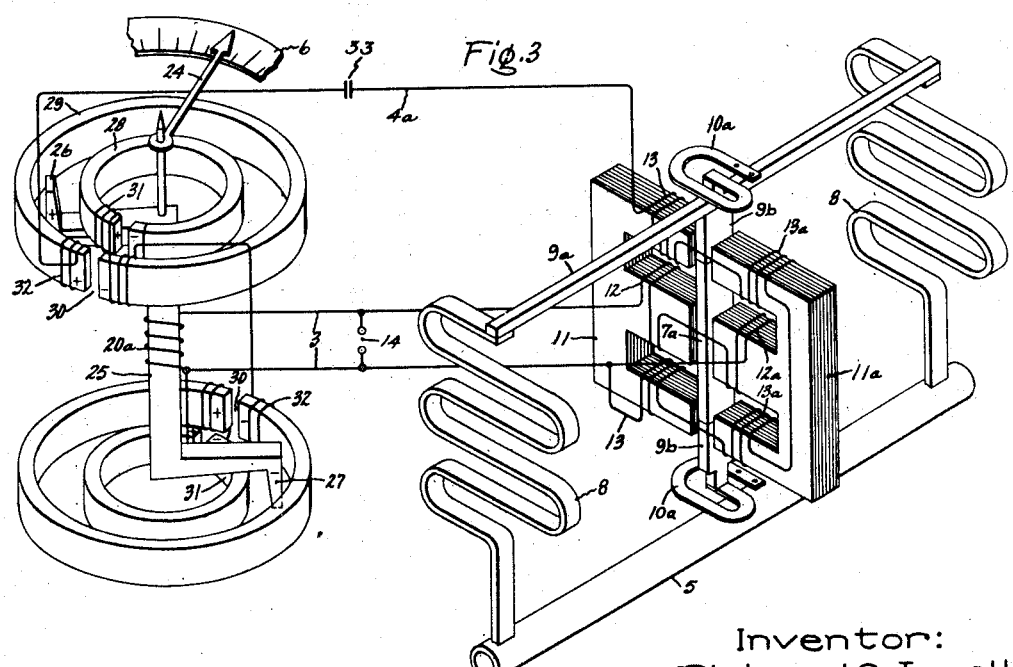
Inventor:
Richard G. Jewell,
by Powell S. Mack
His Attorney.

Patented Oct. 11, 1949

2,484,569

UNITED STATES PATENT OFFICE 2,484,569

SELF-POSITIONING CIRCUIT BALANCING TELEMETER RECEIVER

Richard G. Jewell, Swampscott, Mass., assignor to General Electric Company, a corporation of New York Application December 15, 1948, Serial No. 65,312

3 Claims. (Cl. 318—24)

My invention relates to electric telemetering systems and apparatus suitable for converting a small linear motion at the transmitter into a long scale rotary motion at the receiver, and includes a novel form of receiver having no moving coils which positions itself in response to the signal received and in so doing reduces the signaling current to zero. Only three wires or conductors are required between transmitter and receiver.

The features of my invention which are believed to be novel and patentable will be pointed out in the claims appended hereto. For a better understanding of my invention reference is made in the following description to the accompanying drawings in which Fig. 1 represents an explanatory illustration of a simple form of my telemetering system. Fig. 2 is a side view of the receiver illustrated, shown at the left in Fig. 1, and Fig. 3 represents preferred embodiments of my transmitter and receiver having duplicate parts to provide mechanical and electrical balance.

In Fig. 1 there are illustrated a transmitter 1 and a receiver 2 interconnected by an exciting circuit 3 and a signal circuit 4. The system as here represented is used for indicating the pressure in a conduit 5 at the transmitter on a scale 6 at the receiver. The pressure changes in conduit 5 are converted into the linear movement of a magnetic armature 7 by means of a flat hollow metal tube 8 which is bent back and forth on itself in a curved zigzag fashion and is fixed at the lower end to the stationary conduit 5 and opens into the conduit, so that the interior of such tube communicates with the pressure in the conduit. The upper end of the tube is closed and fastened to the lower end of armature 7 by a nonmagnetic coupling part 9. When pressure increases in the conduit 5 and tube 8, the tube expands in the manner of a Bourdon tube except that the motion of the free upper end is linear instead of rotary because of the reverse curves in the tube. An increase in pressure moves the end at 9 and the armature 7 upward, and a decrease in pressure moves the armature downward. The armature 7 will be guided as necessary by guides 10 at the top and bottom as indicated.

Magnetic armature 7 is spaced from the pole faces of and cooperates with a stationary E-shaped electromagnetic core structure 11 having an exciting winding 12 on its center leg and two similar secondary signaling current coils 13 on its outer legs. The winding 12 is excited from a suitable A.-C. supply 14. The two coils 13 are connected in series opposition with the signaling circuit 4 and over such circuit to the receiver. The armature 7 has a length corresponding to the distance between the centers of the pole faces of the outer limbs of the E-shaped magnetic core structure 11, and extends between such pole faces and over the center pole face, and is spaced from each by equal air gaps and hence forms a flux path for the fluxes between such pole faces. When the armature is centrally located in its range of travel as it will be at some selected pressure, the reluctance of the two flux paths therethrough will be equal, the voltages induced in the coils 13 will be equal and since they are connected in series opposition to the circuit 4, no voltage will be impressed on such circuit by the transmitter under this condition. At some higher pressure the armature will have moved upward, reducing the flux through the lower leg and its secondary coil and increasing the flux through the upper limb and its secondary coil as indicated in Fig. 1. The magnetic parts operate below saturation and the total flux remains constant, but shifts between the outer limbs of the core structure in accordance with the linear vertical movement of armature 7. Under the conditions represented in Fig. 1 the fluxes induced in the opposed coils 13 will be unequal and a voltage proportional to their difference will be impressed upon signaling circuit 4. This signaling voltage will vary with pressure and will have one phase relation with respect to the excitation supply 14 when the upper secondary coil predominates, and will have approximately a 180-degree reverse phase relation when the lower secondary coil predominates.

The receiver is also provided with stationary exciting and secondary windings and acts as a flux shifting transformer somewhat like the transmitter, but is of a different structure, and the flux shifting armature is freely movable and rotates through a range of operation of the order of 300 degrees. The stationary magnetic structure of the receiver comprises a C-shaped core member 15 and a U-shaped core member 16 having one limb 17 extending into the gap of the C-shaped core and spaced from the pole faces thus formed in the C-shaped core by equal air gaps. The other limb 18 of core 16 terminates in a circular magnetic hub and pole piece 19 at the center of the C-shaped core. The exciting winding 20 is wound on the yoke of core part 16 and receives its excitation from the same source 14 as does the transmitter. The secondary winding 21 of the receiver is wound about the C-shaped core part 15 and is connected in series with the secondary of the transmitter over circuit 4. The armature of the receiver comprises a magnetic part 22 which forms a flux path between center pole piece 19 and the C-shaped core part 15, but separated from both by air gaps so as to be freely rotatable about pole piece 19 as a center. The armature 22 is rotatively mounted on a shaft 23 passing through the center of the pole piece 19 and the center of the circle of the C-shaped core 15, and may have attached thereto a pointer 24 cooperating with the scale 6, which will be calibrated and marked in pressure units in the conduit 5.

The path of the primary exciting flux of the receiver is through the U-shaped core 16, the pole piece 19, the armature 22; and then it divides and returns to the limb 17 of core 16 through the C-shaped core part 15, part going one way and the remainder going the other way about core C to the gap wherein limb 17 is located. Since the magnetic parts of the flux path remain unsaturated and practically the total reluctance is represented by the air gap, this flux divides equally in core part 15 as represented by dotted lines. It is noted that the two flux paths in the C-shaped core part for the primary flux are in opposite directions at any given instant through those sections of the secondary winding 21 extending in opposite directions from the position of the armature 22, and hence, the voltage which this flux tends to induce in these winding sections will be in opposition. By analogy to the transmitter these winding sections may be considered to correspond to the opposite coils 13 of the transmitter. In the transmitter any difference in secondary voltage of the two similar coils 13 produced by the primary flux is due to a difference in the flux therethrough by reason of a displacement of the armature 7 from a central position, whereas in the receiver any difference in voltage of the two sections of the secondary winding produced by the primary flux will be due to the difference in the number of turns in such two sections threaded by equal fluxes, and is determined by displacement of the armature 22 from a central position. Thus, if armature 22 be positioned diametrically opposite to limb 17, the two opposed sections of winding 21 will have equal numbers of turns, and the voltages induced therein by only the primary flux of the receiver will be equal. Since the position and movement of armature 7 of the transmitter are determined by the pressure in conduit 5, while the armature 22 of the receiver is freely movable and the secondary windings of these devices are connected together, the armature 22 of the receiver will always automatically seek such a rotary position as to cause its resultant secondary voltage to be equal and opposite to the resultant secondary voltage of the transmitter and cause the current in the secondary circuit to be zero.

If the resultant secondary voltages of the transmitter and receiver are not equal, a current will flow in the secondary circuit and it will tend to produce a flux in the receiver core 15 which traverses such core all in one direction. This will add to one divided part of the primary flux and subtract from the other part, represented in Fig. 1 by dotted lines, and upset the equality of flux distribution. This will produce a rotary torque on the armature 22 in such a direction as to reduce the secondary current flow and restore the equality of flux distribution. It will do this by changing the relative number of turns in the opposed secondary winding sections of the receiver to bring the system back to a balanced resultant secondary voltage condition. When the transmitter armature passes through a midposition and the phase of its resultant secondary voltage shifts 180 degrees, the armature of the receiver will pass through its midposition, and its resultant secondary voltage will shift 180 degrees. Thus the apparatus utilizes phase sensitivity as well as magnitude sensitivity. The direction of rotation of the receiver armature 22 for a given direction of movement of the transmitter armature 7 may be reversed by reversing any one of the complete secondary or exciting windings of transmitter or receiver. Thus a very small linear motion of the armature 7 from a position where all the primary flux threads one of its secondary coils to a position where all of this flux threads the other secondary coil will result in approximately a 300-degree rotation of the receiver armature. This is accomplished with no moving coils or slip rings or contact-making or breaking devices at the receiver or transmitter, and by the use of a maximum of four wires between transmitter and receiver. The apparatus does not involve saturable cores or employ permanent magnets, and is not a variable reactance type of device. In most cases the same source of excitation will already be available at both transmitter and receiver.

In Fig. 3 there is shown a system in principle similar to that already described but employing a double unit both in transmitter and receiver which provides superior mechanical and magnetic balance in these devices. In the transmitter there are two pressure expansion tubes 8 connected into conduit 5 with their movable ends connected to a common connecting member 9a and through it to a magnetic armature 7a and arranged to move such armature up and down in response to pressure changes in the conduit 5. The armature is guided to move along a vertical line by flat resilient guide springs 10a at top and bottom, fastened between nonmagnetic armature extensions, such as 9b, and some stationary support, not shown; but the rivet holes shown in the free ends of these support springs indicate where they are to be fastened to stationary supporting structure. These springs have negligible influence on the vertical position of the armature, this being determined by the pressure sensitive tubes 8, but the flat springs 10a are designed to resist movement of the armature in lateral directions and to maintain it vertical and centered laterally between the two E-shaped core structures 11 and 11a shown. These core structures are similar and their pole faces cooperate with the common armature 7a in the same way as in the single E-shaped core unit transmitter of Fig. 1. However, in Fig. 3, the sidewise attractive force between the armature 7a and the two core structures is in opposite directions and is equal and is, therefore, balanced; and the resultant undesirable sidewise magnetic force that necessarily exists in Fig. 1 is not present in Fig. 3.

The two E-shaped core structures 11 and 11a of Fig. 3 have exciting primary coils 12 and 12a connected in series to the A.-C. exciting source 14 through lines 3, and so that their exciting fluxes add in the armature 7a. Thus the central pole pieces of the two E-shaped cores have the same polarity at any instant, and cores and coils are similar so that these fluxes are equal and magnetic balance is maintained. The outer legs of the two E-shaped cores are wound with similar secondary coils and connected in series so that the secondary voltages of the two upper coils 13 and 13a add and are in opposition to the secondary voltages of the two lower coils 13 and 13a. The secondary circuit of the transmitter is connected to the secondary coils of the receiver through a telemetering circuit corresponding to the circuit 4 of Fig. 1, but which utilizes as one line of such circuit one of the exciting circuit connections. Thus, the line 4a and the lower line of exciting circuit 3 in Fig. 3 comprise the secondary telemetering circuit between transmitter and receiver. A similar arrangement might be used in Fig. 1.

The receiver of Fig. 3 has a rotary magnetic armature 25 excited by a stationary primary coil 20a connected through circuit 3 to source 14. The armature 25 has an axial portion extending along the axis of rotation and about which coil 20a is wound, so that it is feasible to make the coil stationary. At the opposite ends of the axial portion of the magnetic armature 25 it is extended at right angles in opposite directions from the axis of rotation in the form of radial spider arms, and at equal distances from the axis of rotation these extensions are again bent at right angles away from each other and in opposite directions to form the pole pieces 26 and 27 at equal distances from and on opposite sides of the axis of rotation. The two spider arm and pole piece extensions are similar, so that the center of gravity of this rotary armature lies in the axis of rotation.

The two pole pieces 26 and 27 cooperate with similar stationary stator elements each consisting of a pair of C-shaped magnetic rings 28 and 29 of different diameters and essentially concentric with each other and with the axis of rotation, one ring 28 being of a diameter to form an internal stator element for the armature pole piece 26 and the other ring 29 being of a larger diameter to form an external stator element for the same pole piece 26. The pole piece 26 may thus rotate in a circle between the two stator elements, and the air gap spacing is made such that the radial magnetic attraction forces between a pole piece and its two stator elements are equal and opposite. The openings or air gaps at 30 in the C-shaped stator elements 28 and 29, which together may be considered as the upper stator, are on the same radial line. The lower stator is identical to the upper stator and similarly cooperates with the lower armature pole piece 27. The openings in the two lower stator elements are positioned 180 degrees from those in the top stator to conform with the 180-degree displacement of the upper and lower rotary armature pole pieces 26 and 27.

The several stator elements are wound with distributed secondary coils 31 and 32 and connected in series through the telemetering circuit to the secondary coils of the transmitter. Only end portions of these coils are represented but it is to be understood that such coils extend completely about their C-shaped core peripheries. The secondary coils 31 on the inner stator elements are similar and the coils 32 on the outer stator elements are similar, and the number of turns in the inner and outer coils are made such as to provide balanced flux relations without saturation and with no resultant radial magnet force on the armature. The coils 31 and 32 of the upper stator element are wound in the same direction about their core structures, and the coils 31 and 32 of the lower stator element are wound in the same direction about their core structures but in the opposite direction as compared to the upper stator element. Thus, assuming that both primary and secondary circuits have current flowing therein, the polarity relations in the receiver at a given instant may be such as indicated by the plus (+) and minus (−) marks on the rotor pole pieces and on the stator pole pieces adjacent the gaps 30. If, however, the resultant secondary voltage of the transmitter changes in polarity, the polarity marks on the stator of the receiver will all change. To conform more nearly to the receiver of Fig. 1, the receiver of Fig. 3 might use a stationary magnetic connection between the air gap at 30 between the upper and lower stators. However, I have found that the apparatus operates just as well without such magnetic connection, the return flux circuit between the pole pieces 26 and 27 being through the stator elements and then through the air between upper and lower stator elements.

The structure of the receiver of Fig. 3 may be considered to have two rotor armatures, each cooperating with two stators, as compared to one rotor armature and one stator in the receiver of Fig. 1. Thus, the upper half of the rotor element of Fig. 3 and the upper outer stator element may be considered to correspond to the receiver of Fig. 1, but with an all air flux return path for the armature magnetic circuit. The structure of Fig. 3, however, is mechanically and magnetically balanced and, if properly designed, will have no resultant radial, mechanical or magnetic force components to cause lateral bearing friction. The rotor of the receiver of Fig. 3 will have a midscale position where the armature pole pieces 26 and 27 are diametrically opposite the air gap 30 when the armature 7a of the transmitter is in midposition and the voltages induced in the opposed secondary coils are equal, and will rotate in opposite directions from such midscale position for opposite movements of the transmitter armature 7a and in proportion to such movements. The useful range of rotation of the receiver is about 300 degrees. The direction of rotation of the receiver armature for a given direction of movement of the transmitter armature may be reversed by reversing any one complete winding circuit on transmitter or receiver such, for example, as the winding circuit containing both of the secondary winding coils of the transmitter. This device is capable of transmitting small linear movement into greatly amplified proportional rotary movements with high accuracy and reliability.

The leakage flux between the upper stator and lower stator in the receiver of Fig. 3 tends to be of uniform distribution. Hence, with no voltage in the telemetering circuit from the transmitter, but with the system excited, the receiver will seek a midscale position. If not in midscale position where the pole pieces 26 and 27 are diametrically opposite their corresponding stator air gaps, the fluxes entering the stator cores will cut unequal stator winding sections in opposite directions and produce a resultant transformer current that will flow through the transmitter and tend to move its armature 7a from midposition to produce an offsetting transformer action. The transmitter armature, however, does not move except as controlled by the pressure, while the armature of the receiver is freely movable; as a result the receiver armature is the element that moves to restore the voltage balance in the telemetering circuit. When the transmitter armature moves from a midposition in response to pressure changes, the voltage balance is upset and a current flows to the transmitter, causing its armature to move to a new position where its transformer action is equal and opposite to that of the transmitter and restoring the voltage balance. Thus the transmitter and receiver act as two single phase transformers, both having movable elements which may vary the secondary transformer voltage in either direction from a zero value. The transmitter transformer is controlling because the movement of its armature is determined by an outside agency, while the armature of the receiver is freely movable. The transmitter armature moves in a linear direction and over a small range to produce a given voltage change, while the receiver armature has a rotary movement over a proportionally larger range to produce an equalizing voltage change. Also, the direction of movement of the receiver armature is determined by the direction of movement of the transmitter armature. The two transformer devices are constructed so that there is no mechanical or magnetic unbalance to interfere with the movement of their movable elements.

The C-shaped stator core elements of the receiver of Fig. 3 are indicated as being of uniform cross section, as conforming to true circular shapes, as being concentric to the axis of rotation, and as having uniform distributed windings. Slight variations with respect to one or more of these conditions may be desirable to compensate for some nonuniformity in the magnetic material used, to obtain a desired receiver scale distribution in relation to the pressure variations or other quantity measured at the transmitter, etc.; and such variations and other obvious modifications are intended to be within the scope of my invention and claims.

In Fig. 3 there is shown a condenser 33 in the secondary circuit. While such condenser is not essential, sufficient capacity here to reduce the inductive reactance to substantially the direct current resistance of this circuit is beneficial in increasing the operating torque of the receiver to a maximum.

What I claim as new and desire to secure by Letters Patent of the United States, is:

1. A telemetering receiver comprising a single phase transformer device having a core structure composed of stationary and rotatable magnetic parts, separated by air gaps across which the magnetizing flux of the transformer passes, the rotatable part having an elongated section extending along its axis of rotation and, at either end thereof, oppositely radially extending spider and oppositely axially extending pole portions, a stationary primary winding about the elongated axial section of said rotatable part, the stationary part of said core structure comprising a pair of C-shaped portions spaced apart substantially concentric with each other and with the axis of rotation of the rotary part, adjacent each end of said elongated axial section with the rotary pole piece portions at such ends extending freely into the spacing between such C-shaped portions, the openings in the C-shaped portions of one pair being on the opposite side of the axis of rotation of the openings in the other pair, and a secondary winding comprising distributed coils on each such C-shaped portion said coils being connected in series to produce a resultant secondary voltage which varies from a maximum in one phase direction to a maximum in the opposite phase direction as the rotary part is rotated from a position where its pole pieces are closely adjacent one side of said C-openings to a position where its pole pieces are closely adjacent the other side of said C-openings.

2. A telemetering receiver comprising a single phase transformer device having stationary and rotatable core parts separated by air gaps across which the magnetizing flux of the transformer passes, the stationary part including a C-shaped portion concentric with the axis of rotation of the rotatable part and having a distributed secondary coil thereon, the rotatable core part having a pole piece separated from the C-shaped portion by an air gap such that when said rotatable part is rotated said pole piece moves closely adjacent to and about said C-shaped portion, an axially extending core portion magnetically associated with the rotatable core part and a stationary primary winding for producing the magnetizing flux of said transformer through said axially extending core part and said rotatable core part and across said gap into said C-shaped portion, said flux inducing opposing voltages into those portions of the distributed secondary coil which are on opposite sides of the rotary pole piece position so that the rotary position of the rotatable core part determines the magnitude and phase direction of the resultant secondary voltage induced in said coil, said secondary coil being adapted to be energized from a telemetering circuit by a comparable single phase voltage which is variable in phase direction and magnitude whereby the rotary part of said transformer type of receiver is caused to rotate into a position where its induced secondary voltage is equal and opposite to such telemetering voltage.

3. A telemetering receiver comprising a single phase transformer device having stationary and rotatable magnetic core parts included in the magnetic circuit of such transformer device, the stationary magnetic core part comprising a C-shaped magnetic portion and a U-shaped magnetic portion one limb of which is in alignment with the central axis of the C-portion and the other limb of which extends into the gap in the C-opening of such portion but separated from both end surfaces of such C-portion by equal air gaps, the rotating core part extending between the axial limb of the U-shaped portion toward the inner periphery of the C-shaped portion but separated from both by air gaps, a stationary primary winding on the yoke of the U-shaped portion and a distributed secondary winding wound on the C-shaped portion such that the secondary winding sections on opposite sides of the rotor position have opposing secondary voltages induced therein.

RICHARD G. JEWELL.

REFERENCES CITED

The following references are of record in the file of this patent:

UNITED STATES PATENTS

| Number | Name | Date |
|---|---|---|
| 705,482 | Thiermann | July 22, 1902 |
| 2,332,297 | Carbonara | Oct. 19, 1943 |
| 2,379,417 | Conrad | July 3, 1945 |